Oct. 21, 1941.  R. SCHLEICHER  2,259,589
LIQUID SHOCK ABSORBER FOR MOTORCYCLE FORKS
Filed Nov. 1, 1938
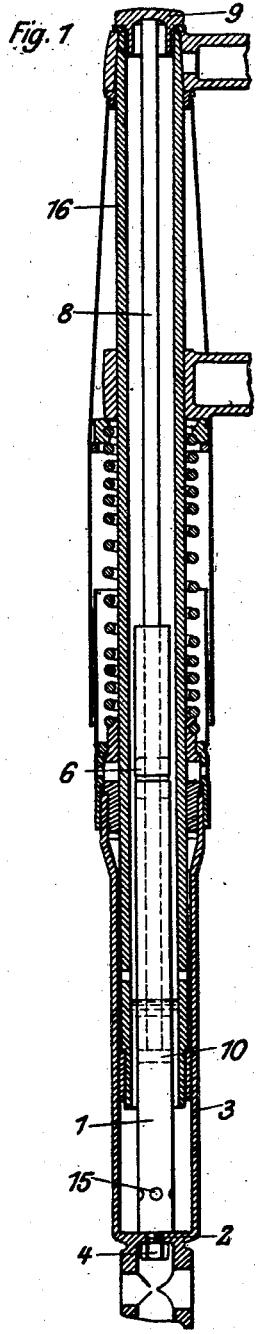
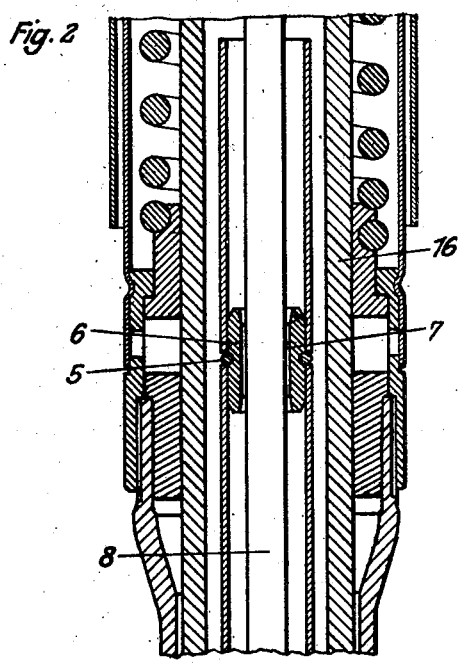
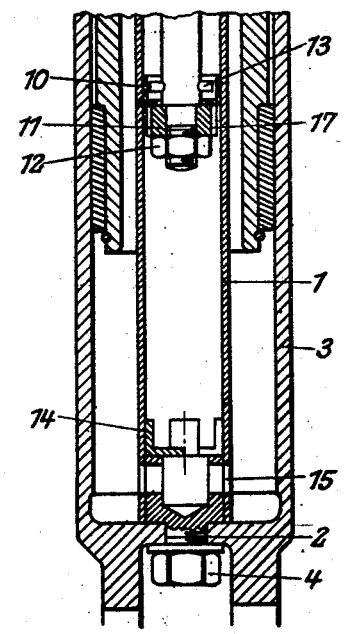
INVENTOR:
RUDOLF SCHLEICHER
by A. A. Clide
ATTORNEY Patented Oct. 21, 1941

2,259,589

UNITED STATES PATENT OFFICE 2,259,589

LIQUID SHOCK ABSORBER FOR MOTORCYCLE FORKS

Rudolf Schleicher, Munich, Germany, assignor to the firm Bayerische Motoren Werke Aktiengesellschaft, Munich, Germany Application November 1, 1938, Serial No. 238,150
In Germany November 16, 1937

13 Claims. (Cl. 267—34)

This invention relates to a fluid shock absorber, and more particularly to one which is adapted for use with a vehicle, such for example, as a motor cycle.

An object of the invention is the provision of an improved shock absorber.

Another object of this invention is to provide a shock absorber which may be easily and quickly mounted and removed from a vehicle.

A more specific object of this invention is the provision of an improved shock absorbing and springing device for motorcycle forks.

With these and incidental objects in view, the invention consists in certain novel features of construction and combination of parts which are set forth in the appended claims, a preferred form of embodiment whereof is hereinafter described with reference to the drawing which accompanies and forms part of the specification.

An example of construction of the invention is shown diagrammatically in the accompanying drawing, wherein:

Fig. 1 shows a vertical section of a fork sheath in the hollow space of which there is shown in elevation a liquid shock absorber according to the invention; and Fig. 2 shows a vertical section of the shock absorber to a larger scale.

All the parts of the shock absorber proper are located in a tube 1 provided at its closed end with a screw-threaded plug 2 which serves to secure an unsprung member such as the movable fork tube 3 by means of a nut 4. At a predetermined distance below the open end of the tube 1 there is fitted a guiding member 6 secured in a suitable manner as by a clamping spring 5, through the bore 7 of which there is guided a piston rod 8 of which the upper end may be rigidly connected to the spring member through a closure screw 9, whilst at its lower end a valve 10 and a guide plate 11 are held by suitable means such as a nut 12. A pin 13 or other suitable means in the piston rod 8 serves to prevent the valve 10 from being opened too far. A second valve 14 is provided near the bottom of the tube 1 and underneath this valve, bores 15 for the admission of the damping liquid are provided in the shock absorber tube. The closure screw 9 forms the closure for the upper opening of the stationary fork tube 16, whereby the piston rod 8 with the upper valve 10 and the guide plate 11 forms the stationary part of the shock absorber, and the tube 1 with the guide piece 6 the movable part thereof. The guide plate 11 is provided at its periphery with suitable openings such as the milled grooves 17 for the passage of the damping liquid.

The operation of this liquid shock absorber is as follows:

During the upward movement of the lower fork tube 3 with the shock absorber tube 1 and guide member 6, there is produced, by the suction action of the latter, above the stationary valve 10, a certain negative pressure by which the valve is drawn in and opened up to the stop pin 13. The space between the two valves 10 and 14 is made smaller by the upward movement of the lower fork tube 3 with the shock absorber tube 1, and the liquid located above the valve 14 is forced through the valve 10. By the downward movement of the fork tube 3 with the absorber tube 1 and guide member 6, the pressure of the latter on the liquid column serves to close the upper valve 10, and the liquid is forced slowly through the bore 7 of the guide member 6 along the piston rod 8, whilst the damping of the recoil takes place, which can be adjusted according to the selection in diameter of differently large bores 7 in the guide member 6. Underneath the valve 10 a certain negative pressure is produced in the absorber tube 1, whereby the lower valve 14 is opened and fresh liquid is again sucked in from the fork tube 3 from the bores 15. The liquid which collects above the guide member 6 gradually rises up to the upper edge of the absorber tube 1 and then runs along this back into the storage tank of the lower fork tube 3. In this manner a constant circulation of the shock absorbing liquid takes place, whereby only a very small quantity of this liquid is necessary.

While the shock absorber above described is particularly suitable for use in connection with motorcycle forks, it is obvious that the construction is not limited to this alone, but may be used in any manner where a readily releasable shock absorber is desired.

Accordingly, while it be noted that the construction shown and described will serve admirably to accomplish the objects stated above, it is to be understood, however, that the construction disclosed above is intended merely as illustrative of the invention and not as limited, as various modifications thereof may be made without departing from the invention as designed by a proper interpretation of the claims which follow.

Having thus described the invention, what I claim and desire to secure by Letters Patent is:

1. In a motorcycle, a wheel fork including a frame structure having a pair of vertically spaced members, a wheel-supporting and shock-absorbing unit for said fork including three substantially concentric tubes, the intermediate one of which is rigidly interconnected between and depends from said spaced members, a wheel support, means for guiding the outer tube on said intermediate tube for relative sliding movement and preventing relative movement thereof in the radial direction, means for rigidly interconnecting the inner and outer tubes to said wheel support, a concentric piston rod connected to said frame structure and mounted inside said inner tube, a shock-absorbing fluid within said tube, a first valve means on the end of said piston rod for permitting flow of said fluid in the upper direction only, and second valve means permitting the flow of said fluid from said outer tube to said inner tube.

2. The combination according to claim 1, in combination with springing means intermediate said outer tube and said frame.

3. In a vehicle having a frame, a wheel supporting member, and shock absorbing means for said wheel supporting member, comprising, in combination, three substantially vertical concentric tubes, the intermediate one of which is rigidly interconnected with said frame, means for guiding the outer tube on said intermediate tube for relative sliding movement and preventing relative movement thereof in the radial direction, means for rigidly interconnecting the inner and outer tubes to said wheel supporting member, a concentric piston rod connected to said frame and mounted inside said inner tube, a shock absorbing fluid in said tubes, a guide plate provided with a grooved peripheral surface, connected to the end of said piston rod, a first valve means mounted on said guide plate for permitting flow of said fluid in the upper direction only, means for limiting the movement of said valve, and second valve means permitting flow of said fluid from said outer tube to said inner tube.

4. In a vehicle having a frame, a wheel supporting member, and shock absorber means for resiliently connecting said frame to said wheel supporting member, including a tube closed at its lower end and rigidly interconnected at that end with said wheel supporting member, a piston rod depending from said frame inside of and concentric with said tube, a unidirectional valve on the end of said rod, cooperating with said tube, means for guiding said piston rod within said tube with a predetermined substantial amount of clearance to form a dampening throttle, a shock absorbing fluid in said tube, a pair of additional tubes surrounding said first tube, closed at their outer ends, and respectively connected to said frame and said wheel supporting member, and means for guiding said additional tubes for relative sliding movement while preventing relative movement in the radial direction.

5. In a vehicle having a frame, a wheel supporting member, and shock absorber means for resiliently connecting said frame to said wheel supporting member including a tube closed at its lower end and rigidly interconnected at that end with said wheel supporting member, a piston rod extending from said frame inside of and concentric with said tube, a unidirectional valve on the end of said rod, cooperating with said tube, means for guiding said piston rod within said tube with a predetermined amount of clearance, a clamping spring for holding said guiding means within said first tube, a shock absorbing fluid in said tube, and a pair of additional tubes surrounding said first tube, one relatively slidably guided upon the other, closed at their outer ends, and respectively connected to said frame and said wheel supporting member.

6. In a motorcycle, a wheel fork including a frame structure, a wheel support, a pair of tubes, means for guiding said tubes for relative sliding movement and preventing relative movement in the radial direction, one of said tubes being closed at one end and rigidly interconnected with said frame structure against relative movement, the other of said tubes being closed at one end and rigidly connected to the wheel support, a third tube mounted concentrically within said pair of tubes, open at one end and closed at its other end and there connected to the closed end of one of said pair of tubes, a piston rod connected to the closed end of the other of said pair of tubes, shock absorbing fluid in said tubes, and a one way valve on the end of said rod for permitting flow of said fluid through said third tube in one direction.

7. In a vehicle having a frame, a wheel supporting member, a pair of tubes, one of which is slidably guided upon the other, one of said tubes being closed at one end and there connected to the frame, the other of said tubes being closed at one end and connected to the wheel supporting member, a third tube mounted concentrically within said pair of tubes, open at one end and closed at its other end and there connected to the closed end of one of said pair of tubes, a piston rod connected to the closed end of the other of said pair of tubes, a piston rod guide mounted within said third tube at a slight distance from said piston rod to form a dampening throttle therebetween, shock absorbing fluid in said tube, and a one way valve on the end of said rod for permitting flow of said fluid through said third tube in one direction.

8. The combination according to claim 6, in which said third tube is provided with openings near its closed end to permit flow of fluid from within one of said pair of tubes to within said third tube.

9. A liquid shock absorber for interconnecting two relatively movable members, comprising, in combination, a tube open at one end and closed at the other end and rigidly interconnected at the closed end with one of said members, a piston rod mounted on the second member inside of and concentric with said tube, means for guiding said piston rod within said tube with a predetermined amount of clearance to form a dampening throttle, a uni-directional valve on the end of said piston rod, and a pair of additional tubes surrounding said first tube, one relatively slidably guided upon the other, closed at their outer ends, and respectively connected to said first and second members.

10. The combination according to claim 9, in which said first tube is provided with openings near its closed end to permit flow of fluid within one of said pair of surrounding tubes within said first tube.

11. The combination according to claim 9, in which said first tube is provided with openings near its closed end to permit flow of fluid from within one of said pair of surrounding tubes to within said first tube, in combination with a one-way valve means to prevent flow of fluid from said first tube in the surrounding tube of said pair.

12. A liquid shock absorber for interconnecting two relatively movable members, comprising, in combination, a tube open at one end and closed at the other end and rigidly interconnected at the closed end with one of said members, a piston rod mounted on the second member inside of and concentric with said tube, means for guiding said piston rod within said tube with a predetermined amount of clearance, a clamping spring for holding said guiding means within said tube, a uni-directional valve on the end of said piston rod, and a pair of additional tubes surrounding said first tube, one relatively slidably guided upon the other, closed at their outer end, and respectively connected to said first and second members.

13. In a vehicle having a frame, a wheel supporting member comprising a first hollow cylindrical tube open at one end, closed at its other end, having an integral forked wheel-journal support descending from said closed end, and provided with a bore between the fork support in its closed end, and shock absorbing means for said wheel supporting member, including a second hollow cylindrical tube rigidly connected with said frame, spaced means for guiding said first tube on said second tube for relatively sliding movement, a third hollow cylindrical tube, means rigidly attaching said third tube to said wheel supporting member, concentrically with said first and second tubes, comprising a plug in the lower end of said third tube, having a threaded extension projecting through said bore of said first tube, and a nut rigidly clamping said plug to said wheel supporting member, a piston rod connected to said frame and mounted concentrically within said third tube, a shock absorbing fluid within said tube, a first valve means on the end of said piston for permitting flow in the upward direction only, and second valve means permitting flow of said fluid from said first tube to said third tube.

RUDOLF SCHLEICHER.